United States Patent
Stewart et al.

(10) Patent No.: US 10,122,024 B2
(45) Date of Patent: Nov. 6, 2018

(54) BIPOLAR PLATE HAVING HALF PLATES OF VARYING THICKNESS AND FUEL CELL STACK HAVING SAME

(71) Applicant: Volkswagen AG, Wolfsburg (DE)

(72) Inventors: Ian Stewart, Vancouver (CA);
Christian Martin Zillich, Braunschweig (DE); Torsten Schwarz, Wasbuettel (DE)

(73) Assignee: Volkswagen AG, Wolfsburg (DE)

(*) Notice: Subject to any disclaimer, the term of this patent is extended or adjusted under 35 U.S.C. 154(b) by 154 days.

(21) Appl. No.: 15/130,048

(22) Filed: Apr. 15, 2016

(65) Prior Publication Data

US 2016/0315332 A1 Oct. 27, 2016

(30) Foreign Application Priority Data

Apr. 23, 2015 (DE) .................. 10 2015 207 455

(51) Int. Cl.
*H01M 8/0247* (2016.01)
*H01M 8/0258* (2016.01)

(52) U.S. Cl.
CPC ....... *H01M 8/0247* (2013.01); *H01M 8/0258* (2013.01); *H01M 2250/20* (2013.01); *Y02T 90/32* (2013.01)

(58) Field of Classification Search
CPC .... H01M 8/0247; H01M 8/0258; H01M 8/02; H01M 2250/20; Y02T 90/32
See application file for complete search history.

(56) References Cited

U.S. PATENT DOCUMENTS

| 7,291,414 B2 | 11/2007 | Goebel et al. | |
| 8,153,316 B2 | 4/2012 | Pierpoint et al. | |
| 2002/0150809 A1* | 10/2002 | Hammerschmidt | H01M 8/02 429/434 |
| 2004/0209150 A1* | 10/2004 | Rock | H01M 8/0258 429/434 |
| 2008/0050558 A1* | 2/2008 | Ohmori | H01M 8/122 428/141 |
| 2008/0138684 A1 | 6/2008 | Lewinski et al. | |
| 2014/0057194 A1 | 2/2014 | Wilkosz | |
| 2014/0212781 A1 | 7/2014 | Tsai et al. | |

FOREIGN PATENT DOCUMENTS

| CN | 1714466 | 12/2005 |
| CN | 101937997 | 1/2011 |
| CN | 104051771 | 9/2014 |
| DE | 11 2005 003 103 B4 | 10/2007 |
| DE | 10 2013 208 450 A1 | 11/2014 |

* cited by examiner

*Primary Examiner* — Jonathan G Leong
*Assistant Examiner* — Aaron J Greso
(74) *Attorney, Agent, or Firm* — Davidson, Davidson & Kappel, LLC

(57) ABSTRACT

A bipolar plate (10) for a fuel cell, including a first half plate (20) having a first thickness (21) and a second half plate (30) having a second thickness (31), the first half plate (20) and the second half plate (30) each being situated with one of their flat sides facing one another, and the first half plate (20) forming a first flow field (22) on its outer side for a first operating medium and the second half plate (30) forming a second flow field (32) on its outer side for a second operating medium is provided. It is provided that the first thickness (21) of the first half plate (20) is on average smaller, at least in sections, than the second thickness (31) of the second half plate (30).

13 Claims, 4 Drawing Sheets

BIPOLAR PLATE HAVING HALF PLATES OF VARYING THICKNESS AND FUEL CELL STACK HAVING SAME

This claims the benefit of German Patent Application DE102015207455.2, filed Apr. 23, 2015 and hereby incorporated by reference herein.

The present invention relates to a bipolar plate for a fuel cell, including a first half plate having a first thickness and a second half plate having a second thickness, the first half plate and the second half plate each being situated with one of their flat sides facing one another, and the first half plate forms a first flow field on its outer side for a first operating medium and the second half plate forms a second flow field on its outer side for a second operating medium.

BACKGROUND

Fuel cells utilize the chemical conversion of a fuel with oxygen to water, in order to generate electrical energy. For this purpose, fuel cells contain the so-called membrane electrode unit (MEA for membrane electrode assembly) as the core component, which is a composite of an ion-conducting, in particular, proton-conducting membrane and an electrode (anode and cathode) situated on each side of the membrane. During operation of the fuel cell, the fuel, in particular, hydrogen $H_2$ or a hydrogen-containing gas mixture, is fed to the anode, where an electrochemical oxidation and simultaneous discharge of electrons takes place ($H_2 \rightarrow 2 H^+ + 2 e^-$). A (water-bound or water-free) transport of the protons $H^+$ takes place from the anode chamber into the cathode chamber via the membrane, which separates the reaction chambers from one another in a gas-tight manner and electrically isolates them. The electrons $e^-$ provided at the anode are fed to the cathode via an electric line. The cathode is supplied with oxygen or an oxygen-containing gas mixture, causing a reduction in oxygen and absorption of electrons to take place ($\frac{1}{2}O_2 + 2 e^- \rightarrow O^{2-}$). At the same time, these oxygen anions react in the cathode chamber with the protons transported via the membrane while forming water ($2H^+ + O^{2-} \rightarrow H_2O$).

The fuel cell is generally formed by a plurality of membrane electrode units assembled in a stack, the electrical outputs of which are cumulative. A bipolar plate assembly (also referred to as bipolar plate), which is used to supply process gases to the anode or cathode of the adjacent membrane electrode units, is situated between two membrane electrode units (MEA) in each fuel cell stack. The assembly is also used to dissipate heat. In addition, bipolar plates are made of an electrically conductive material in order to be able to establish an electrical connection. Thus, they exhibit the three-fold function of supplying process gas to the membrane electrode units, their cooling and electrical connection. Bipolar plates are frequently constructed of two profiled bipolar plate halves, a so-called anode plate and a cathode plate, between which a coolant channel is formed.

Bipolar plates and fuel cell stacks of compact structures are known in the prior art.

DE 11 2005 003 103 B4 describes a fuel cell stack having bipolar plates, which include two nested half plates in certain areas. A solution for a transition between an area having a nested configuration to a non-nested area is described. The transition in this case lies between an active and an inactive area of the fuel cell stack.

The bipolar plate shown in DE 10 2013 208 450 A1 solves the problem of reducing the overall height while simultaneously maintaining a power density. For this purpose, the design of the bipolar plate includes two sheet metal layers. Each of the two sheet metal layers has in cross section a periodic structure with elevations and recesses of the same periodic length. The two sheet metal layers are inserted into each other so that cooling channels are formed between the elevations and recesses of the sheet metal layers.

The two half plates of known bipolar plates are normally of equal thickness.

SUMMARY OF THE PRESENT INVENTION

Weight reduction, reduction of heat capacity, reduction of installation space, cost reduction and increase in power density represent fundamental goals in the design of bipolar plates. These criteria are important, in particular for the mobile use of fuel cells, for example, for the electromotive traction of vehicles.

It is an object of the present invention to further reduce the weight and heat capacity of bipolar plates and, therefore, of fuel cells.

The present invention provides that in the case of a bipolar plate for a fuel cell, which includes a first half plate having a first thickness and a second half plate having a second thickness, the first half plate and the second half plate each being situated with one of their flat sides facing one another, and the first half plate forming a first flow field on its outer side for a first operating medium and the second half plate forming a second flow field on its outer side for a second operating medium, in that the first thickness of the first half plate is on average less, at least in sections, than the second thickness of the second half plate.

In another aspect of the present invention, the present invention provides a fuel cell stack, which includes a plurality of bipolar plates according to the present invention and a plurality of membrane electrode units, the bipolar plates and the membrane electrode units being alternately stacked.

Thus, according to the present invention, one of the two half plates of the bipolar plate is designed with a smaller plate thickness than the other half plate. In this design, the load-bearing function of the bipolar plate, in particular, in the area of the flow fields, is taken over by the thicker of the two half plates of the bipolar plate. In contrast, the function of the thinner half plate is reduced essentially to the physical separation of the operating media, i.e., the gaseous anode and cathode operating media and the coolant flowing between the two half plates, as well as to the electrical and thermal conduction.

A reduction in the weight of the bipolar plate and of the fuel cell stack, which often includes several hundred bipolar plates, is achieved by the design according to the present invention of the first of the two half plates having a thickness smaller than that of the other half plate. In the field of application of fuel cells in vehicles, this weight reduction is accompanied by a savings in fuel. It should be understood that as a result of the material reduction, a savings with respect to material costs is also achieved.

At the same time, the heat capacity of the bipolar plate is also reduced due to its reduction in mass. Thus, during a cold start of the fuel cell stack, the coolant normally flowing between the two half plates and heated in this phase heats the thinner of the two half plates more rapidly and, therefore, the operating medium fed via this half plate to the catalytic electrode more rapidly. Thus, the fuel cell reaction starts sooner and the cold start of a bipolar plate or a fuel cell stack is thereby improved.

An additional advantage is the reduction in the overall installed size. The thickness of the bipolar plate and, therefore, the entire stack height of the fuel cell stack, is effected by the slimmer design of the first half plate as compared to the prior art.

In one preferred specific embodiment, it is provided that the first thickness of the first half plate is no more than 80% of the second thickness of the second half plate, in particular, no more than 70%, preferably no more than 60%. Here, the thickness is preferably selected as thin as possible, so that the structural integrity of the half plate is still sufficient to ensure its manufacture, for example, by deep drawing or pressing, without damaging the plate. If, for example, the thickness of the first half plate is reduced by 25% as compared to the thickness of the second half plate, the result is a reduction of the mass of the bipolar plate, including the thermal mass, by 12.5%.

The absolute thickness of the half plates depends on the material. The half plates are made preferably of a metal or a metal alloy, since metal foils are mechanically particularly stable. In addition, metals have a high electrical and thermal conductivity. A stainless steel is particularly preferably used.

In one preferred specific embodiment, it is provided that the first thickness of the first half plate, i.e., the thinner of the two half plates, is at least 0.060 mm (60 µm) and no more than 0.15 mm (150 µm), in particular, at least 0.070 mm and no more than 0.12 mm, preferably at least 0.075 mm and no more than 0.10 mm. In this embodiment, the first half plate is used below the load carrying capacity of the stack required in the fuel cell stack. This is possible due to the fact that the structural integrity is ensured by the other half plate.

In this design, the second, thicker half plate has a thickness preferably in the range of 0.1 mm to 0.2 mm. This corresponds essentially to thicknesses customary in the prior art.

In one preferred specific embodiment, it is provided that the first thickness of the first half plate is smaller over the entire expanse of the first half plate than the second thickness of the second half plate. This embodiment allows the use of raw materials, in particular, metal foils, of a uniform material thickness for the manufacture. Thus, the half plate may be manufactured from an endless sheet by profiling and (for example, pressing) and cutting to size in a simple and cost-saving manner. In this way, material is also saved along the entire expanse of the bipolar plate, so that in this case the cited advantageous effects are achieved for the entire plate.

The half plates of the bipolar plate according to the present invention have a preferably profiled design, at least in the areas of the flow fields, i.e., of the active area and of the distribution areas between main supply channels and the active area. The profile structure in this case includes flow channels on both sides of the half plates, one flow channel for a gaseous operating medium of the outer side corresponding to a rampart-like elevation on the inner side and vice versa. In the assembled state of the two half plates, flow channels for a coolant emerge between the half plates, i.e., between their inner sides.

In one preferred embodiment, the two half plates are assembled so that their profile structures are at least partly nested, i.e. inserted into one another. In this assembly, a rampart-like elevation of the one plate—in each case viewed from the inner side of the two half plates—projects into a channel of the other plate. The half plates in this embodiment have different channel depths, the shallower channel projecting into the deeper channel, so that enough space still remains between the two half plates for the cooling channel. The nested structure of the bipolar plate reduces its overall thickness, but also the volumes of the inner coolant channels. In connection with a nested structure, the thinner wall thickness of one of the two half plates advantageously results in a greater volume of the coolant channels and, therefore, in less pressure loss of the coolant.

In one preferred specific embodiment, it is provided that the first half plate is an anode plate and the first flow field is an anode flow field for an anode operating gas of a fuel cell, and the second half plate is a cathode plate and the second flow field is a cathode flow field for a cathode operating gas. Thus, in this embodiment, the anode plate corresponds to the first half plate having the smaller wall thickness. One advantage is that volumes of the channel structures of the flow field on the anode side are enlarged as compared to greater wall thicknesses, so that the anode operating medium, for example, hydrogen, experiences less pressure loss. This lowers the risk of a fuel depletion at the anode. The result of this is also that the selection of a gas diffusion layer on the anode side is not—as in the prior art—limited by the condition of a high gas permeability, but rather may be optimized with respect to other properties, for example, with respect to its electrical conductivity or heat conductivity. Thus, materials for the gas diffusion layer on the anode side may be used which are not used in the prior art.

In one alternative specific embodiment, it is provided that the first half plate is a cathode plate and the first flow field is a cathode flow field for a cathode operating gas of a fuel cell, and the second half plate is an anode plate and the second flow field is an anode flow field for an anode operating gas. Thus, in this embodiment, the cathode plate corresponds to the first half plate having the smaller wall thickness. One advantage is that volumes of the channel structures of the flow field on the cathode side are enlarged as compared to greater wall thicknesses, so that the cathode operating medium, for example, air, experiences less pressure loss. This configuration also results in a certain increase in the power density, since the material of the cathode plate occupies less space as compared to cathode plates with greater wall thicknesses.

One additional aspect of the present invention relates to a vehicle having a fuel cell stack according to the present invention. The vehicle is, in particular, a vehicle equipped with an electric motor or traction motor, which receives its electrical drive energy via the fuel cell stack.

The various specific embodiments of the present invention cited in this application are advantageously combinable with one another, unless specified otherwise in individual cases.

BRIEF DESCRIPTION OF THE DRAWINGS

The present invention is explained in greater detail below in exemplary embodiments with reference to the associated drawings.

DETAILED DESCRIPTION

Figure 1:
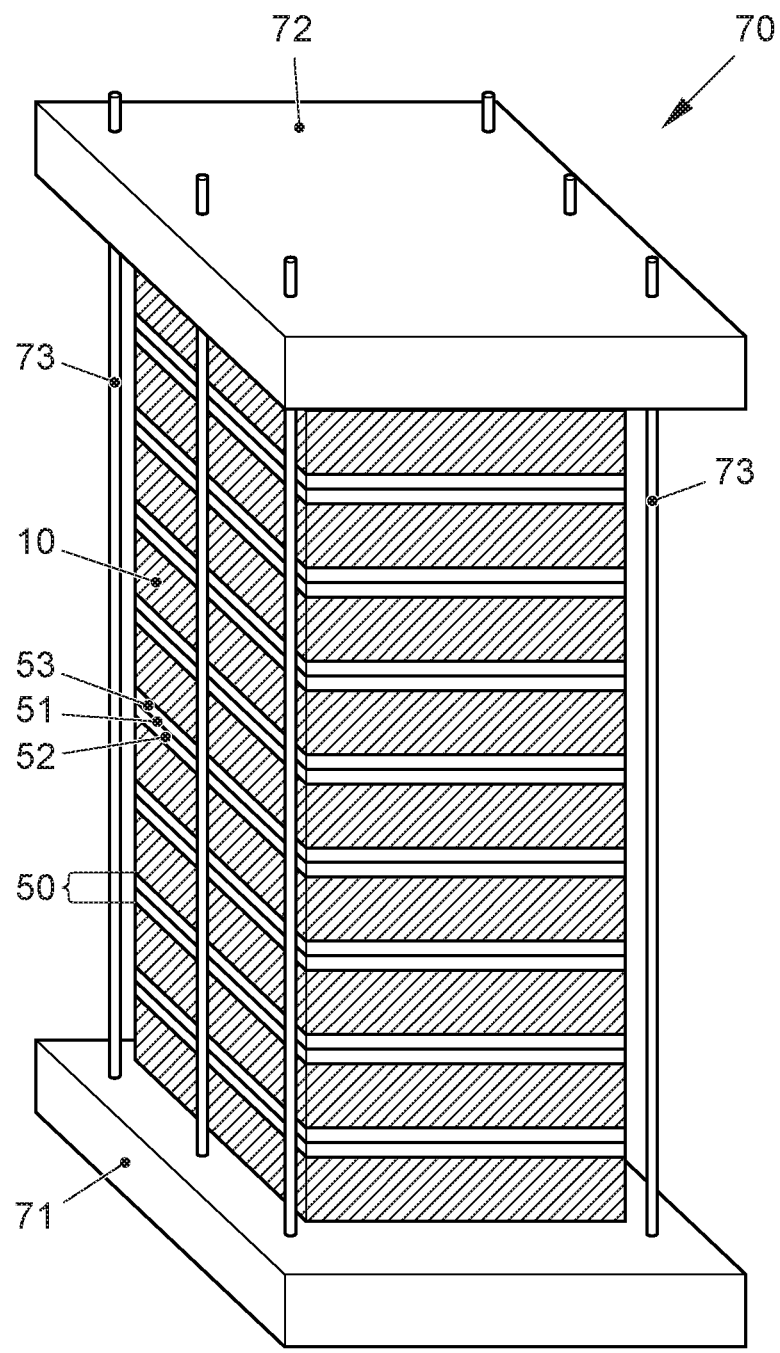
FIG. 1 shows a perspective view of a fuel cell stack.
Figure 2:
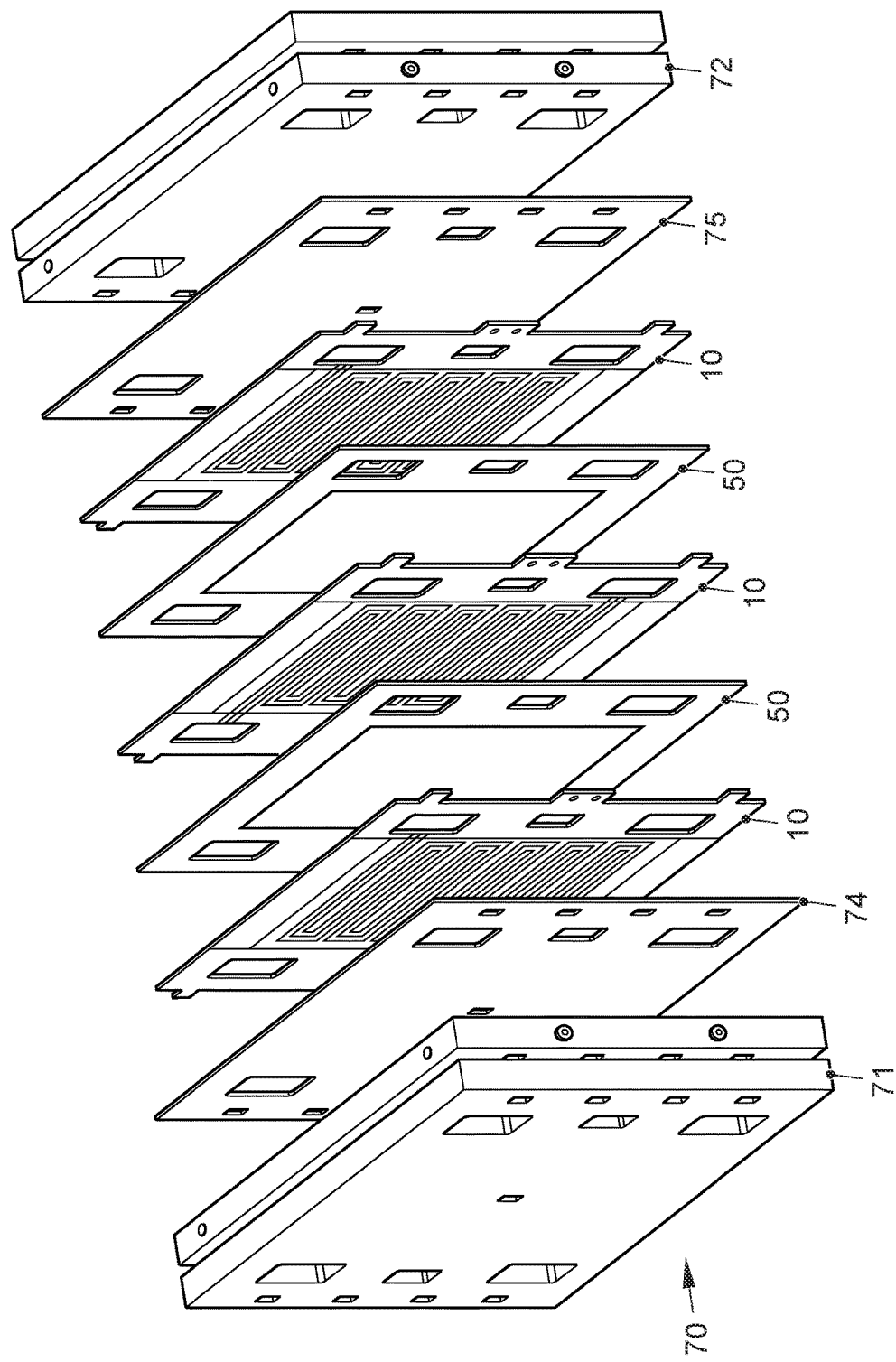
FIG. 2 shows a fuel cell stack in an exploded view.
Figure 4:
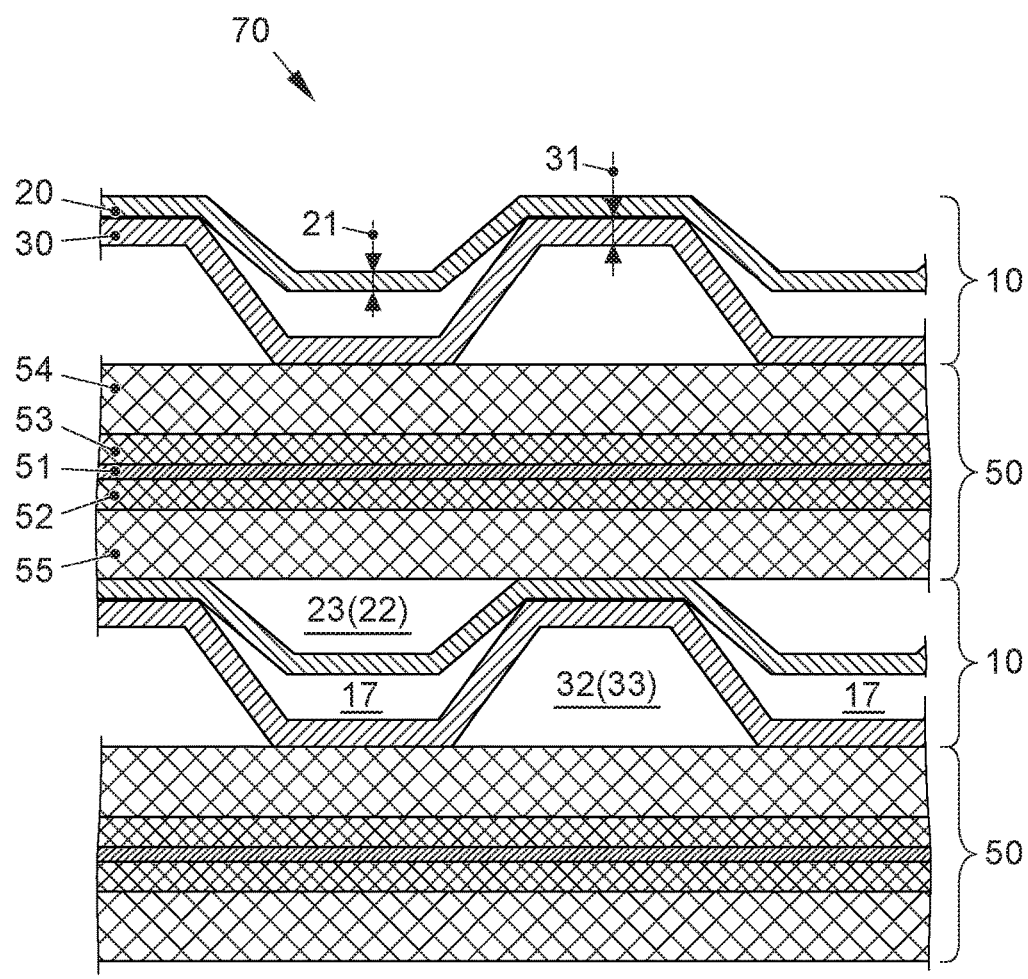
FIG. 4 shows a full section through a fuel cell stack.

FIGS. 1 and 2 show a perspective view and an exploded view of a fuel cell stack 70 used, for example, in an electric vehicle. FIG. 4 shows a sectional view of a fuel cell stack 70. In this case, FIGS. 2 and 4 show merely two individual cells by way of example. Normally, however, a fuel cell stack includes 100 or more individual cells.

Fuel cell stack 70 is composed essentially of bipolar plates 10 arranged alternatingly and membrane electrode units 50, which are clamped between two end plates 71, 72 with the aid of tensioning elements 73 or the like. In addition, two flat seals 74, 75 are also apparent in FIG. 2, which seal the two outermost bipolar plates 10. Not depicted in the figures are seals between bipolar plates 10 and membrane electrode units 50.

According to FIG. 4, each membrane electrode unit (MEA) 50 includes an ion-conductive membrane 51, in particular, a polymer electrolyte membrane, as well as two catalytic electrodes contacting both sides of membrane 51, namely an anode 52 and a cathode 53. Also depicted in FIG. 4 are gas diffusion layers 54, 55, each of which are situated between a bipolar plate 10 and an MEA 50. Cathode layers and anode layers 53 and 52 may be attached directly on membrane 51. This is also referred to in this case as a catalytically coated membrane CCM (catalyst coated membrane). Alternatively, electrode layers 52, 53 are attached directly to adjoining gas diffusion layers 54, 55, which are then also referred to as gas diffusion electrodes. Two bipolar plates 10, together with an MEA 50 situated therebetween, form an individual cell.

Figure 3:
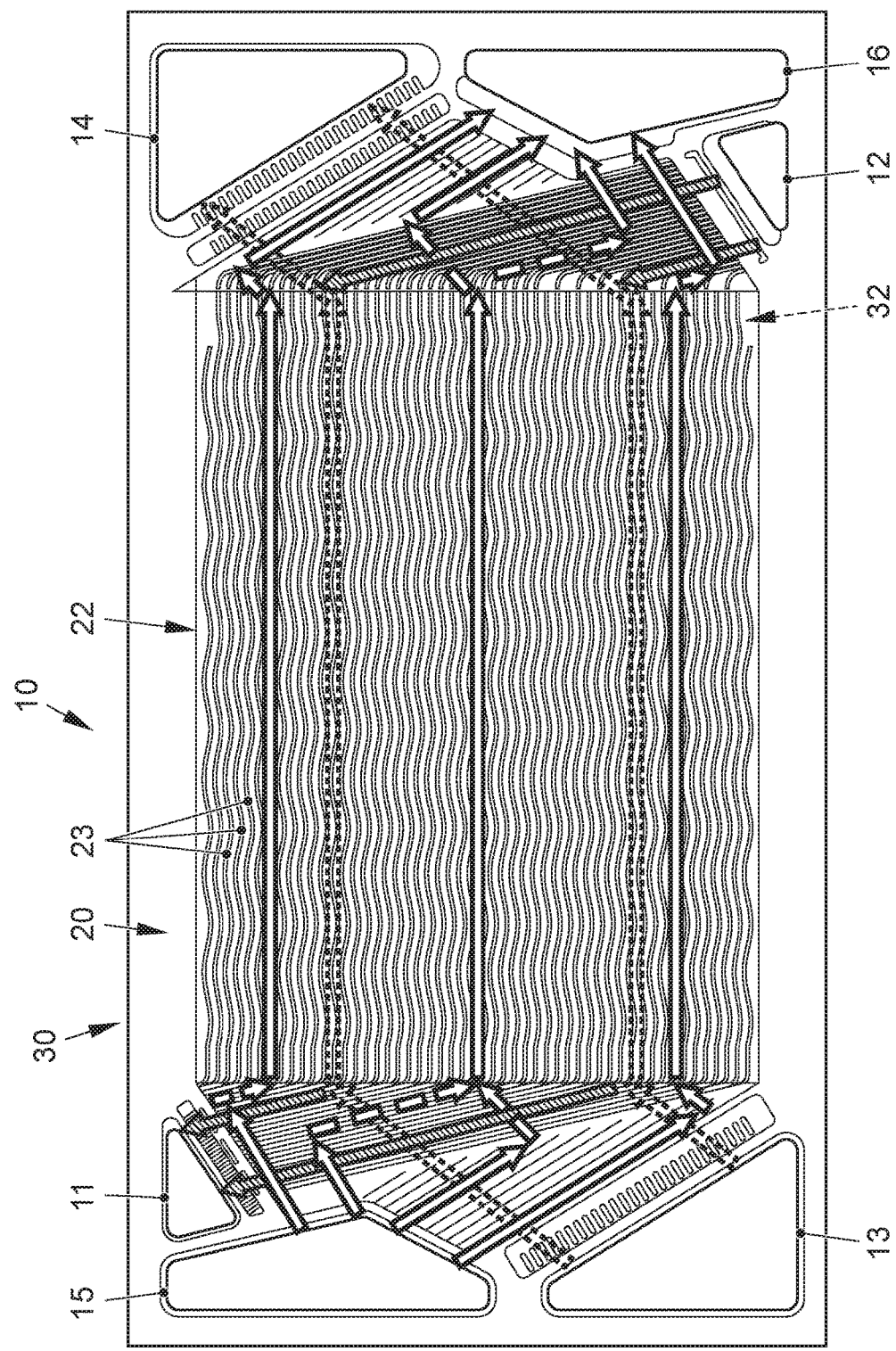
FIG. 3 shows an top view of a bipolar plate.

FIG. 3 shows a top view of a bipolar plate 10 (in a detail configuration differing from that in FIG. 2). It includes two half plates 20, 30, of which only half plate 20 on the anode side is visible in FIG. 3, which hides half plate 30 on the cathode side. Half plates 20, 30 are constructed preferably of metal sheets.

Each MEA 50 and each bipolar plate 10 has six corresponding openings, which are situated in the stack one on top of the other and thus form main channels penetrating the stack. The main channels are used to supply the stack with the three operating media, namely, an anode operating medium, in particular, hydrogen, a cathode operating medium, in particular, air, and the coolant. One supply channel and one discharge channel, respectively, are provided for each operating medium. Thus, bipolar plate 10 (see FIG. 3) has two openings 11, 12 for the anode gas supply and anode gas discharge, two openings 13, 14 for the cathode gas supply and cathode gas discharge and two openings 15, 16 for the coolant supply and coolant discharge.

Two half plates 20 and 30 each have profile structures, which form flow fields 22 and 32 on the outer surfaces. Each flow field 22, 32 includes a plurality of reactant channels (see FIG. 4), namely anode channels 23 and cathode channels 33, which are in fluidic communication with corresponding openings 11, 12 and 13, 14. Thus, the anode operating medium (hydrogen) flows through opening 12, is conducted via corresponding distribution channels on half plate 20 on the anode side into fluid field 22 in the active area, and discharged via corresponding distribution channels and opening 11. On the cathode side hidden in FIG. 3, the cathode operating medium (air) flows through opening 13, is conducted via corresponding distribution channels on half plate 30 on the anode side into fluid field 32 in the active area, and discharged via corresponding distribution channels and opening 14. The coolant is supplied via opening 15 of inner coolant channels 17 and discharged via opening 16.

According to the present invention, the two half plates 20 and 30 of bipolar plate 10 vary in thickness at least in sections.

This is apparent in an exemplary embodiment in FIG. 4.

In this example, thickness 21 of half plate 20 (in this case the anode plate) is less than thickness 31 of half plate 30 (in this case the cathode plate). In the embodiment depicted, second half plate 30 has a thickness 31 of 0.1 mm and first half plate 20 has a thickness 21 of 0.075 mm. Thus, thickness 21 of first half plate 20 is 75% the thickness 31 of second half plate 30. In this way, a reduction of the weight of bipolar plate 10 by 12.5% is achieved as compared to a bipolar plate according to the prior art, in which the two half plates have the same thickness of, for example, at least 0.1 mm. The heat capacity is reduced to the same extent.

Second, thicker half plate 30 acts as a support for the structural integrity in fuel cell stack 70. In this way, it is possible to minimize thickness 21 of first, thinner half plate 20, which essentially effectuates only the separation of operating media and the electric line. The use of first thicknesses 21 of half plates 20 below 0.15 mm or even below 0.1 mm is thus possible.

It is also apparent in FIG. 4 that the two half plates have a meshing nested structure, in which the recesses of half plate 20 engage in corresponding recesses of half plate 30. For this purpose, the recesses of first half plate 20 differ from those of second half plate 30 in terms of their profile height. The effect of this is that cooling channels 17 form between the two half plates 20, 30 when they are inserted into one another.

In the exemplary embodiment shown in FIG. 4, half plate 20 on the anode side has the smaller thickness. The advantage may be seen in the fact that the channel volume of the flow channels of anode flow field 22 is enlarged and the pressure losses of the hydrogen are reduced as a result. This allows the use of a gas diffusion layer 54 on the anode side, which need not be optimized with respect to its gas permeability.

In one alternative specific embodiment not depicted, half plate 30 on the cathode side may have a smaller layer thickness than half plate 20 on the anode side.

For reasons of stability, it is a fundamental advantage if the bottom half plate according to the stack orientation has the greater thickness, since this has a stronger supporting function.

LIST OF REFERENCE NUMERALS

10 bipolar plate
11,12 opening for anode operating medium
13,14 opening for cathode operating medium
15,16 opening for coolant
17 coolant channel
20 first half plate
21 first thickness
22 first flow field
23 reactant channel
30 second half plate
31 second thickness
32 second flow field
33 reactant channel
50 membrane electrode unit
51 membrane
52 catalytic electrode/anode
53 catalytic electrode/cathode
54 gas diffusion layer
70 fuel cell stack
71 first end plate
72 second end plate
73 tensioning element
74 first flat seal
75 second flat seal

What is claimed is:

1. A bipolar plate for a fuel cell, the bipolar plate comprising:
   a first half plate having a first thickness; and a second half plate having a second thickness, the first half plate and the second half plate each being situated with a first half plate side facing a second half plate side, the first half plate forming a first flow field on a first half plate outer side opposite the first half plate side for a first operating medium and the second half plate forming a second flow field on a second half plate outer side opposite the second half plate side for a second operating medium, the first thickness of the first half plate being on average smaller, at least in sections, than the second thickness of the second half plate;

wherein the first thickness of the first half plate is no more than 80% of the second thickness of the second half plate and wherein the first thickness of the first half plate is at least 0.06 mm and no more than 0.15 mm.

2. The bipolar plate as recited in claim 1 wherein the first thickness of the first half plate is no more than 70% of the second thickness of the second half plate.

3. The bipolar plate as recited in claim 2 wherein the first thickness of the first half plate is no more than 60% of the second thickness of the second half plate.

4. The bipolar plate as recited in claim 1 wherein the first thickness of the first half plate is smaller over an entire expanse of the first half plate than the second thickness of the second half plate.

5. The bipolar plate as recited claim 1 wherein the first thickness of the first half plate is at least at least 0.07 mm and no more than 0.12 mm.

6. The bipolar plate as recited claim 5 wherein the first thickness of the first half plate is at least 0.075 mm and no more than 0.10 mm.

7. The bipolar plate as recited in claim 1 wherein the first half plate is an anode plate and the first flow field is an anode flow field for an anode operating gas of a fuel cell stack, and the second half plate is a cathode plate and the second flow field is a cathode flow field for a cathode operating gas.

8. The bipolar plate as recited in claim 1 wherein the first half plate is a cathode plate and the first flow field is a cathode flow field for a cathode operating gas of a fuel cell stack, and the second half plate is an anode plate and the second flow field is an anode flow field for an anode operating gas.

9. The bipolar plate as recited in claim 1 wherein the first and the second half plate have a profiled design and the profile structures are at least partially nested.

10. A fuel cell stack comprising: a plurality of bipolar plates, each bipolar plate being the bipolar plate as recited in claim 1, and a plurality of membrane electrode units, stacked alternatingly.

11. A vehicle comprising the fuel cell stack as recited in claim 10.

12. The bipolar plate as recited in claim 1 wherein the first half plate has first half plate flat sections and the second half plate has second half plate flat sections, the first thickness of the first half plate in the first half plate flat section being on average smaller than the second thickness of second half plate in the second half plate flat section.

13. The bipolar plate as recited in claim 12 wherein the first half plate flat section and the second half plate flat section contact each other.

* * * * *